United States Patent
Komatsu

(10) Patent No.: US 11,791,509 B2
(45) Date of Patent: Oct. 17, 2023

(54) BATTERY PACK

(71) Applicant: HONDA MOTOR CO., LTD., Tokyo (JP)

(72) Inventor: Daigo Komatsu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 17/539,705

(22) Filed: Dec. 1, 2021

(65) Prior Publication Data
US 2022/0173456 A1 Jun. 2, 2022

(30) Foreign Application Priority Data
Dec. 2, 2020 (JP) .................. 2020-200340

(51) Int. Cl.
| | | |
|---|---|---|
| H01M 10/6563 | (2014.01) | |
| H01M 10/6566 | (2014.01) | |
| H01M 10/613 | (2014.01) | |
| H01M 10/625 | (2014.01) | |
| H01M 10/647 | (2014.01) | |
| H01M 10/6557 | (2014.01) | |

(52) U.S. Cl.
CPC ..... *H01M 10/6563* (2015.04); *H01M 10/613* (2015.04); *H01M 10/625* (2015.04); *H01M 2220/20* (2013.01)

(58) Field of Classification Search
CPC ......... H01M 10/6563; H01M 10/6566; H01M 10/613; H01M 10/625; H01M 10/647; H01M 10/6557
See application file for complete search history.

(56) References Cited

U.S. PATENT DOCUMENTS

2003/0211384 A1* 11/2003 Hamada .............. H01M 50/209
429/120
2006/0181247 A1* 8/2006 Marukawa ............ F04D 29/102
320/150
(Continued)

FOREIGN PATENT DOCUMENTS

JP 2007165200 A * 6/2007
JP 2009-004319 A 1/2009
(Continued)

OTHER PUBLICATIONS

JP 2007/165200 A translation (Year: 2007).*
(Continued)

*Primary Examiner* — Ula C Ruddock
*Assistant Examiner* — Amanda Rosenbaum
(74) *Attorney, Agent, or Firm* — Paratus Law Group, PLLC

(57) ABSTRACT

A battery pack includes a battery module in which a plurality of battery cells are stacked, a battery case accommodating the battery module, and a battery cooling mechanism configured to cool the battery module. The battery cooling mechanism includes an air guide duct disposed in a first direction orthogonal to a stacking direction of the plurality of battery cells with respect to the battery module, and a cooling fan disposed on a side opposite to the air guide duct with the battery module interposed therebetween in the first direction. An air intake port of the cooling fan is open on a side opposite to the battery module in the first direction.

8 Claims, 4 Drawing Sheets

(56) References Cited

U.S. PATENT DOCUMENTS

| | | | |
|---|---|---|---|
| 2010/0255360 A1* | 10/2010 | Umemoto | H01M 10/615 |
| | | | 429/158 |
| 2013/0230754 A1* | 9/2013 | Jeong | H01M 10/656 |
| | | | 429/83 |
| 2014/0212721 A1* | 7/2014 | Hiranishi | B60L 50/64 |
| | | | 429/99 |
| 2015/0037632 A1 | 2/2015 | Yamamoto et al. | |
| 2019/0296303 A1* | 9/2019 | Sueyoshi | H01M 10/625 |
| 2020/0194750 A1 | 6/2020 | Kawano | |

FOREIGN PATENT DOCUMENTS

| | | |
|---|---|---|
| JP | 2014-221625 A | 11/2014 |
| JP | 2015-062163 A | 4/2015 |
| JP | WO 2019/021779 A1 | 1/2019 |

OTHER PUBLICATIONS

Mar. 29, 2022, Japanese Office Action issued for related JP Application No. 2020-200340.
Oct. 4, 2022, Japanese Office Action issued for related JP Application No. 2020-200340.
Mar. 7, 2023, Japanese Decision to Grant a Patent issued for related JP Application No. 2020-200340.

* cited by examiner

BATTERY PACK

CROSS-REFERENCE TO RELATED APPLICATION

The present application claims priority from Japanese Patent Application No. 2020-200340 filed on Dec. 2, 2020, the entire content of which is incorporated herein by reference.

TECHNICAL FIELD

The present invention relates to a battery pack mounted on an electric vehicle or the like.

BACKGROUND ART

There has been known a battery pack including a battery module in which a plurality of battery cells are stacked, a battery case that accommodates the battery module, and a battery cooling mechanism that cools the battery module (for example, refer to JP-A-2014-221625). In this type of battery pack, it is required to make the package compact for the purpose of, for example, suppressing a mounting space.

However, when a cooling fan is disposed in the vicinity of the battery module in order to make the battery pack compact, there is a problem that the cooling fan locally guides the air, causing a large variation in a flow rate of the air flowing in the battery module.

SUMMARY

The present invention provides a battery pack capable of reducing a variation in a flow rate of air flowing in a battery module.

According to an aspect of the present invention, there is provided there is provided a battery pack that includes a battery module in which a plurality of battery cells are stacked, a battery case accommodating the battery module, and a battery cooling mechanism configured to cool the battery module. The battery cooling mechanism includes an air guide duct disposed in a first direction orthogonal to a stacking direction of the plurality of battery cells with respect to the battery module, and a cooling fan disposed on a side opposite to the air guide duct with the battery module interposed therebetween in the first direction. An air intake port of the cooling fan is open on a side opposite to the battery module in the first direction.

According to the present invention, it is possible to reduce the variation in the flow rate of air flowing in the battery module.

DESCRIPTION OF EMBODIMENTS

Figure 1:
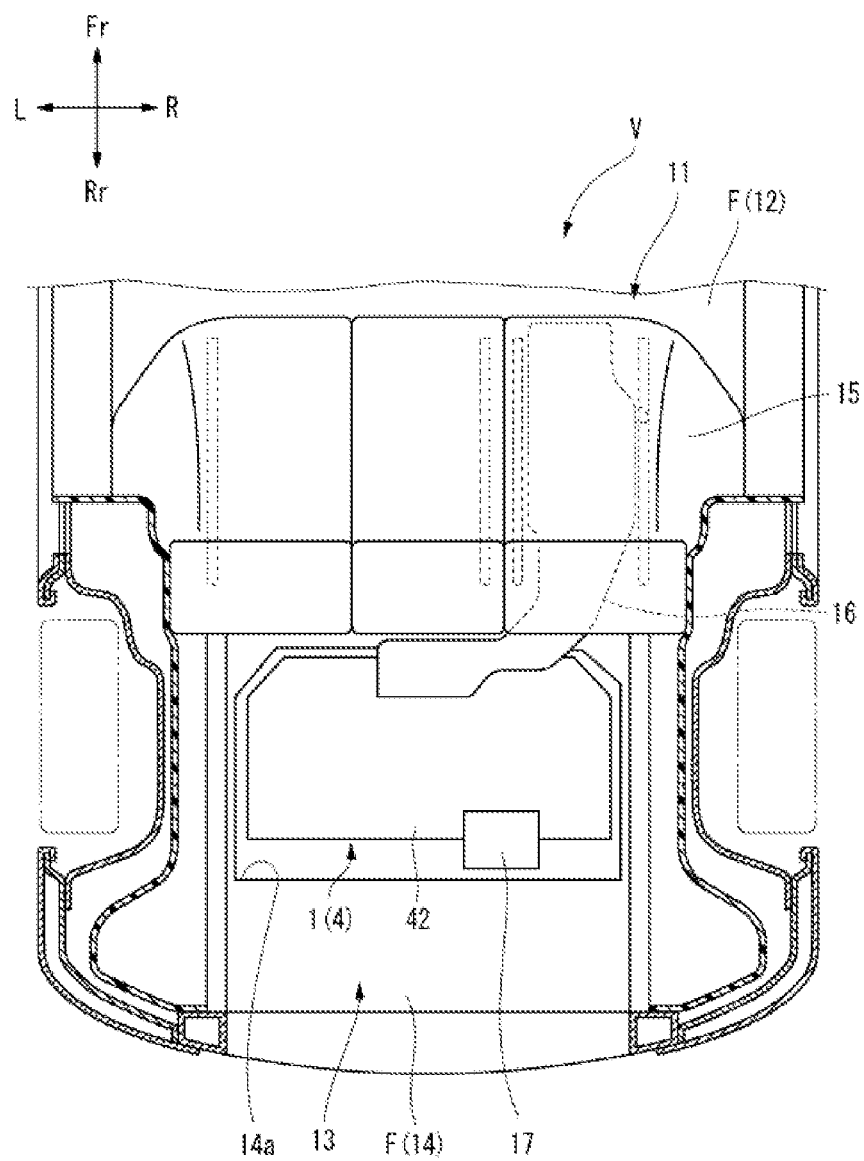
FIG. 1 is a plan view showing a rear portion of a vehicle interior and a luggage compartment 13 of a vehicle V in which a batter pack 1 is mounted.

Hereinafter, an embodiment of the present invention will be described with reference to FIGS. 1 to 4. The drawings are to be viewed from a direction of reference numerals, and in the following descriptions, front, rear, left, right, upper and lower are based on directions viewed from a driver. A front side of a vehicle in the drawings is denoted by Fr, a rear side thereof is denoted by Rr, a left side thereof is denoted by L, a right side thereof is denoted by R, an upper side thereof is denoted by U, and a lower side thereof is denoted by D.

[Vehicle]

First, a vehicle V on which a battery pack 1 according to an embodiment of the present invention is mounted will be described.

Figure 2:
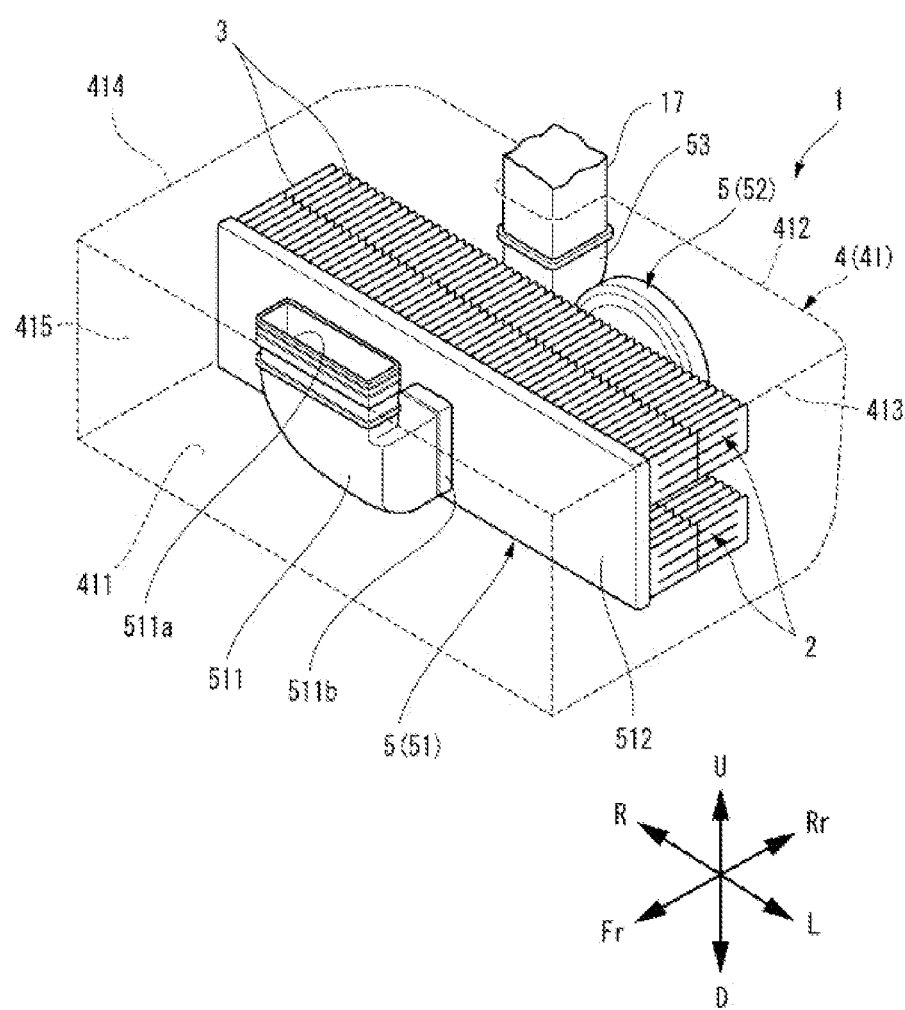
FIG. 2 is a perspective view showing the battery pack 1.
Figure 3:
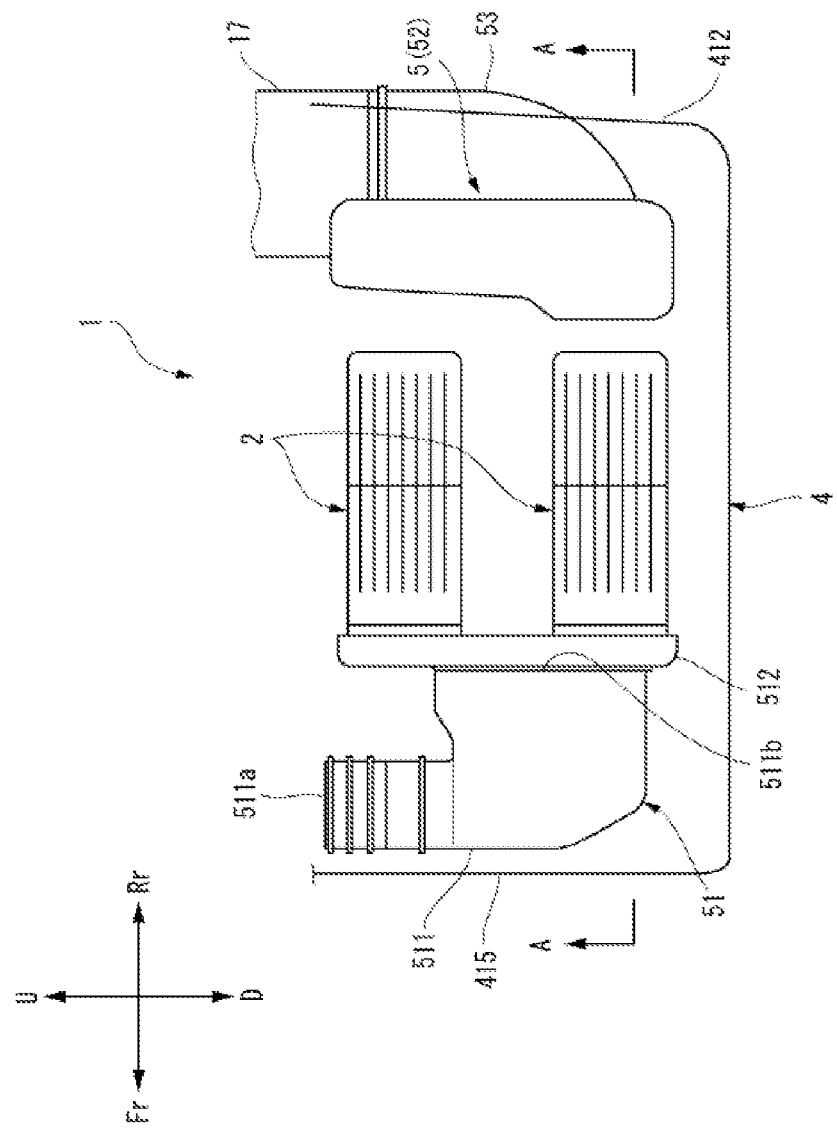
FIG. 3 is a side view of the battery pack 1.

As shown in FIG. 1, the vehicle V according to the present embodiment is, for example, a hybrid vehicle, and is mounted with a battery pack 1 that accommodates a battery module 2 (see FIGS. 2 and 3).

A floor panel F of the vehicle V includes a front floor panel portion 12 constituting a floor portion of a vehicle interior 11, and a rear floor panel portion 14 constituting a floor portion under a rear seat 15 and a floor portion of a luggage compartment 13. The rear seat 15 is supported on a front upper portion of the rear floor panel portion 14. In addition, an accommodation recess 14a for accommodating the battery pack 1 is recessed in the rear floor panel portion 14 under the luggage compartment 13, and the battery pack 1 is disposed in the accommodation recess 14a.

The battery pack 1 introduces cooling air from the vehicle interior 11 via an air intake duct 16 disposed between the rear seat 15 and the rear floor panel portion 14, and discharges the air used for cooling the battery module 2 to the luggage compartment 13 via an exhaust duct 17. Hereinafter, the battery pack 1, which is a main part of the present invention, will be described with reference to FIGS. 2 to 4.

[Battery Pack]

Figure 4:
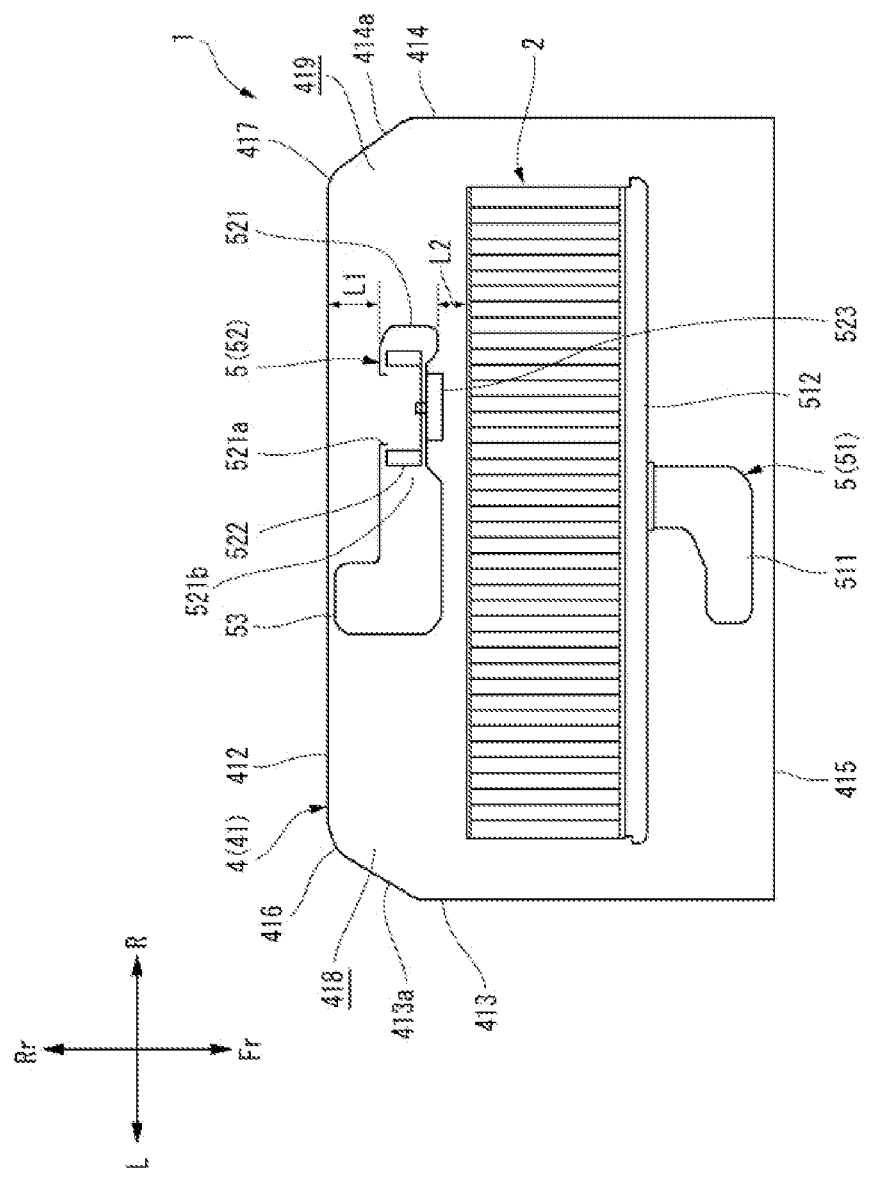
FIG. 4 is a sectional view taken along a line A-A of FIG. 3.

As shown in FIGS. 2 to 4, the battery pack 1 includes the battery module 2 in which a plurality of battery cells 3 are stacked, a battery case 4 that accommodates the battery module 2, and a battery cooling mechanism 5 that cools the battery module 2.

(Battery Module)

The battery module 2 is formed by stacking the plurality of battery cells 3 in a predetermined direction (left-right direction in the present embodiment), and an air flow path through which the cooling air flows is formed between the stacked battery cells 3. Although the battery pack 1 according to the present embodiment includes the two battery modules 2 arranged in upper and lower two stages, the number and arrangement of the battery modules 2 are not limited thereto.

(Battery Cooling Mechanism)

The battery cooling mechanism 5 includes an air guide duct 51 disposed in a first direction orthogonal to the stacking direction of the plurality of battery cells 3 with respect to the battery module 2, and a cooling fan 52 disposed on a side opposite to the air guide duct 51 with the battery module 2 interposed therebetween in the first direction. For example, in the present embodiment in which the battery cells 3 are stacked in the left-right direction, the first direction is a front-rear direction of the vehicle V, the air guide duct 51 is disposed on the front side of the battery module 2, and the cooling fan 52 is disposed on the rear side of the battery module 2. Hereinafter, the first direction orthogonal to the stacking direction of the plurality of battery cells 3 is referred to as a front-rear direction according to the embodiment. In addition, the left-right direction may be referred to as a stacking direction in some cases.

(Air Guide Duct)

The air guide duct 51 includes an air intake portion 511 into which air from the outside is introduced, and an air guide portion 512 that supplies the air introduced from the air intake portion 511 to the battery module 2. The air intake portion 511 has a tubular shape, and an air intake port 511a into which air from the outside is introduced is formed at one end portion of the air intake portion 511, and a connection port 511b connected to the air guide portion 512 is formed at the other end portion thereof. The air guide portion 512 has a tray shape that covers the entire facing surface of the battery module 2 facing the air guide duct 51, and an air guide space, through which the air introduced from the air intake portion 511 can be supplied to the entire facing surface of the battery module 2, is formed between the facing surfaces of the air guide portion 512 and the battery module 2. According to the air guide duct 51, it is also possible to appropriately cool the battery cells 3 in the vicinity of both end portions of the battery module 2.

(Cooling Fan)

The cooling fan 52 is, for example, a sirocco fan, and includes a fan case 521 having an air intake port 521a and an exhaust port 521b, a cylindrical rotary fan 522 rotatably disposed in the fan case 521, and a motor 523 that is disposed at a center portion of the rotary fan 522 and drives the rotary fan 522 to rotate. In the fan case 521, the air intake port 521a is formed in one side surface portion of the rotary fan 522 in a rotation axis direction and communicates with an inner peripheral side space of the rotary fan 522. In addition, the exhaust port 521b is formed to protrude from an outer peripheral portion of the fan case 521 along a tangential direction of the rotary fan 522, and communicates with a relay duct 53. The exhaust port 521b is connected to the exhaust duct 17 via the relay duct 53.

The cooling fan 52 is disposed such that the rotation axis direction of the rotary fan 522 is oriented in the front-rear direction of the vehicle V. The air intake port 521a of the cooling fan 52 is open to the side opposite to the battery module 2 in the front-rear direction. In this way, since the air that is supplied from the air guide duct 51 and cools the battery cells 3 of the battery module 2 can be widely introduced into the air intake port 521a of the cooling fan 52, a variation in a flow rate of the air flowing in the battery module 2 can be reduced.

The air intake portion 511 of the air guide duct 51 and the cooling fan 52 are disposed substantially at the center of the battery module 2 in the stacking direction of the battery cells 3. According to such an arrangement configuration, since the variation in the flow rate of the air flowing in the battery module 2 can be further reduced, it becomes easy to uniformly cool all the battery cells 3 of the battery module 2.

(Battery Case)

The battery case 4 includes a case main body 41 that accommodates the battery module 2, and a cover 42 (see FIG. 1) that covers an opening portion (not shown) of the case main body 41. The case main body 41 includes a bottom wall portion 411 on which the battery module 2 is placed, four side wall portions 412 to 415 rising from the bottom wall portion 411, and an opening portion surrounded by the four side wall portions 412 to 415.

The air intake port 521a of the cooling fan 52 faces the first side wall portion 412 (for example, a rear wall portion) of the battery case 4 in the front-rear direction among the side wall portions 412 to 415, and is separated from the first side wall portion 412. In this way, a pressure loss of the air introduced from the air intake port 521a of the cooling fan 52 can be reduced as compared with a case where the air intake port 521a is brought close to the first side wall portion 412.

As shown in FIG. 4, in the front-rear direction, a distance L1 between the cooling fan 52 and the first side wall portion 412 is greater than a distance L2 between the battery module 2 and the cooling fan 52. In this way, since a chamber (expansion chamber) is formed between the cooling fan 52 and the first side wall portion 412, the pressure loss of the air introduced from the air intake port 521a of the cooling fan 52 can be further reduced.

The first side wall portion 412 intersects the second side wall portion 413 (for example, a left wall portion) and the third side wall portion 414 (for example, a right wall portion) that are respectively on one side (left side) and the other side (right side) of the battery cells 3 in the stacking direction. The second side wall portion 413 has an inclined surface 413a that approaches a center of the first side wall portion 412 in the stacking direction of the battery cells 3 as the second side wall portion 413 approaches the first side wall portion 412 in the front-rear direction, and the third side wall portion 414 has an inclined surface 414a that approaches the center of the first side wall portion 412 in the stacking direction of the battery cells 3 as the third side wall portion 414 approaches the first side wall portion 412 in the front-rear direction. In this way, it is possible to suppress retention of air at corner portions of the battery case 4 and to improve a cooling efficiency.

A connection portion 416 between the first side wall portion 412 and the inclined surface 413a of the second side wall portion 413 is a curved surface, and a connection portion 417 between the first side wall portion 412 and the inclined surface 414a of the third side wall portion 414 is a curved surface. In this way, the flow of the air from the corner portions of the battery case 4 to the air intake port 521a of the cooling fan 52 becomes smooth, and the pressure loss of the air can be further reduced.

A first space 418 formed by the first side wall portion 412 and the second side wall portion 413 and a second space 419 formed by the first side wall portion 412 and the third side wall portion 414 are symmetrical with respect to the center of the first side wall portion 412. In this way, it becomes easy to uniformly cool all the battery cells 3 of the battery module 2.

At least the following matters are described in the present description. Although corresponding constituent elements or the like in the above embodiments are illustrated in parentheses, the present invention is not limited thereto.

(1) A battery pack (battery pack 1) including:

a battery module (battery module 2) in which a plurality of battery cells (battery cells 3) are stacked;

a battery case (battery case 4) accommodating the battery module; and a battery cooling mechanism (battery cooling mechanism 5) configured to cool the battery module, wherein the battery cooling mechanism includes an air guide duct (air guide duct 51) disposed in a first direction (front-rear direction) orthogonal to a stacking direction of the plurality of battery cells with respect to the battery module, and a cooling fan (cooling fan 52) disposed on a side opposite to the air guide duct with the battery module interposed therebetween in the first direction, and wherein an air intake port (an intake port 521a) of the cooling fan is open on a side opposite to the battery module in the first direction.

According to (1), the air that is supplied from the air guide duct and cools the battery cells of the battery module can be widely introduced into the air intake port of the cooling fan, and a variation in a flow rate of the air flowing in the battery module can be reduced.

(2) The battery pack according to (1),
wherein the air guide duct includes
an air intake portion (air intake portion 511) into which air from the outside is introduced, and
an air guide portion (air guide portion 512) that supplies the air introduced from the air intake portion to the battery module, and
wherein the air guide portion covers the entire surface of the battery module on an air guide duct side.

According to (2), it is also possible to appropriately cool the battery cells in the vicinity of both end portions of the battery module.

(3) The battery pack according to (2),
wherein the air intake portion and the cooling fan are disposed substantially at a center of the battery module in the stacking direction.

According to (3), it becomes easy to uniformly cool all the battery cells of the battery module.

(4) The battery pack according to any one of (1) to (3),
wherein the battery case includes
a case main body (case main body 41) including a bottom wall portion (bottom wall portion 411) on which the battery module is mounted, side wall portions (side wall portions 412 to 415) rising from the bottom wall portion, and an opening portion surrounded by the side wall portions, and
a cover (cover 42) covering the opening portion of the case main body, and
wherein the air intake port of the cooling fan faces a first side wall portion (first side wall portion 412) of the battery case in the first direction among the side wall portions, and is separated from the first side wall portion.

According to (4), a pressure loss of the air introduced from the air intake port of the cooling fan can be reduced.

(5) The battery pack according to (4),
wherein in the first direction, a distance (distance L1) between the cooling fan and the first side wall portion is larger than a distance (distance L2) between the battery module and the cooling fan.

According to (5), since a chamber is formed between the cooling fan and the first side wall portion, the pressure loss of the air introduced from the air intake port of the cooling fan can be further reduced.

(6) The battery pack according to (4) or (5),
wherein the first side wall portion intersects with a second side wall portion (second side wall portion 413) and a third side wall portion (third side wall portion 414) that are respectively on one side and another side in the stacking direction,
wherein the second side wall portion has an inclined surface (inclined surface 413*a*) that approaches a center of the first side wall portion in the stacking direction as the second side wall portion approaches the first side wall portion in the first direction, and
wherein the third side wall portion has an inclined surface (inclined surface 414*a*) that approaches the center of the first side wall portion in the stacking direction as the third side wall portion approaches the first side wall portion in the first direction.

According to (6), it is possible to suppress retention of air at corner portions of the battery case.

(7) The battery pack according to (6),
wherein a connection portion (connection portion 416) between the first side wall portion and the inclined surface of the second side wall portion is a curved surface, and
wherein a connection portion (connection portion 417) between the first side wall portion and the inclined surface of the third side wall portion is a curved surface.

According to (7), the flow of the air from the corner portions of the battery case to the air intake port of the cooling fan becomes smooth, and the pressure loss of the air can be further reduced.

(8) The battery pack according to (6) or (7),
wherein a first space (first space 418) formed by the first side wall portion and the second side wall portion and a second space (second space 419) formed by the first side wall portion and the third side wall portion are symmetrical with respect to the center of the first side wall portion.

According to (8), it becomes easy to uniformly cool all the battery cells of the battery module.

What is claimed is:

1. A battery pack comprising:
a battery module in which a plurality of battery cells are stacked;
a battery case accommodating the battery module; and
a battery cooling mechanism configured to cool the battery module,
wherein the battery cooling mechanism includes:
an air guide duct configured to introduce cooling air from an outside of the battery case into an inside of the battery case, the air guide duct being disposed in a first direction orthogonal to a stacking direction of the plurality of battery cells with respect to the battery module; and
a cooling fan disposed on a side opposite to the air guide duct with the battery module interposed therebetween in the first direction, the cooling fan being disposed inside the battery case,
wherein the cooling fan includes:
a fan case having an air intake port and an exhaust port;
a motor; and
a rotary fan configured to be rotationally driven by the motor, the rotary fan being disposed inside the fan case,
wherein the air intake port of the cooling fan is open on a side opposite to the battery module with the rotary fan interposed therebetween in the first direction,
wherein the cooling fan is configured to suck in the cooling air that has been introduced into the inside of the battery case and has cooled the battery module from the air intake port into an inside of the fan case, and discharge the cooling air from the exhaust port to the outside of the battery case.

2. The battery pack according to claim 1,
wherein the air guide duct includes
an air intake portion into which air from the outside is introduced, and
an air guide portion that supplies the air introduced from the air intake portion to the battery module, and
wherein the air guide portion covers the entire surface of the battery module on an air guide duct side.

3. The battery pack according to claim 2,
wherein the air intake portion and the cooling fan are disposed substantially at a center of the battery module in the stacking direction.

4. The battery pack according to any one of claim 1,
wherein the battery case includes
a case main body including a bottom wall portion on which the battery module is mounted, side wall portions rising from the bottom wall portion, and an opening portion surrounded by the side wall portions, and a cover covering the opening portion of the case main body, and wherein the air intake port of the cooling fan faces a first side wall portion of the battery case in the first direction among the side wall portions, and is separated from the first side wall portion.

5. The battery pack according to claim 4, wherein in the first direction, a distance between the cooling fan and the first side wall portion is larger than a distance between the battery module and the cooling fan.

6. The battery pack according to claim 4, wherein the first side wall portion intersects with a second side wall portion and a third side wall portion that are respectively on one side and another side in the stacking direction, wherein the second side wall portion has an inclined surface that approaches a center of the first side wall portion in the stacking direction as the second side wall portion approaches the first side wall portion in the first direction, and wherein the third side wall portion has an inclined surface that approaches the center of the first side wall portion in the stacking direction as the third side wall portion approaches the first side wall portion in the first direction.

7. The battery pack according to claim 6, wherein a connection portion between the first side wall portion and the inclined surface of the second side wall portion is a curved surface, and wherein a connection portion between the first side wall portion and the inclined wherein a connection portion between the first side wall portion and the inclined surface of the third side wall portion is a curved surface.

8. The battery pack according to claim 6, wherein a first space formed by the first side wall portion and the second side wall portion and a second space formed by the first side wall portion and the third side wall portion are symmetrical with respect to the center of the first side wall portion.

\* \* \* \* \*